United States Patent [19]

McGrath

[11] 4,159,531

[45] Jun. 26, 1979

[54] PROGRAMMABLE READ-ONLY MEMORY SYSTEM FOR INDICATING SERVICE MAINTENANCE POINTS FOR MOTOR VEHICLES

[76] Inventor: Joseph G. McGrath, 16034 Gallatin St., Fountain Valley, Calif. 92708

[21] Appl. No.: 853,037

[22] Filed: Nov. 21, 1977

[51] Int. Cl.[2] ........................ G06F 3/14; G06F 13/00; G06F 15/06; G08B 5/00

[52] U.S. Cl. .................................... 364/900; 364/424; 340/52 D

[58] Field of Search ... 364/900 MS File, 200 MS File, 364/424, 550, 551; 340/52 R, 52 D, 52 F; 73/116; 235/92 MT, 92 T

[56] References Cited

U.S. PATENT DOCUMENTS

| | | | |
|---|---|---|---|
| 2,435,907 | 2/1948 | Schirokauer | 340/52 D |
| 3,792,445 | 2/1974 | Bucks et al. | 364/900 |
| 3,906,437 | 9/1975 | Brandwein et al. | 364/424 X |
| 3,925,754 | 12/1975 | Ota et al. | 340/52 D |
| 3,940,735 | 2/1976 | Kronenberg | 340/52 D |
| 3,946,364 | 3/1976 | Codomo et al. | 364/900 |
| 3,972,022 | 7/1976 | Goto et al. | 340/52 D |
| 4,031,363 | 6/1977 | Freeman et al. | 364/424 |
| 4,053,868 | 10/1977 | Cox et al. | 340/52 F |
| 4,067,061 | 1/1978 | Juhasz | 364/900 |
| 4,084,262 | 4/1978 | Lloyd et al. | 364/900 |

*Primary Examiner*—Melvin B. Chapnick
*Attorney, Agent, or Firm*—Keith D. Beecher

[57] ABSTRACT

A solid state unit is provided which is intended as an aid in the maintenance and upkeep of a motor vehicle, and which serves as a reminder of the next maintenance mileage point, and the items to be serviced at the next maintenance operation. The unit also serves as a permanent record of the scheduled maintenance that has been performed on the vehicle throughout its lifetime. The unit is intended to be mounted under the dashboard, or at any other convenient location within the vehicle. The unit includes a programmable read-only memory (PROM) in which data is permanently stored representing the mileage at which the next maintenance operations are to be performed, as well as data identifying the items requiring servicing at the next maintenance point. The unit also includes an appropriate display, and solid state logic circuitry which, when activated, causes the mileage at which the next scheduled maintenance is to be performed, as well as the items to be serviced at the next scheduled maintenance point, to be displayed. In addition, the unit may be conditioned to display the last maintenance mileage point, and the items actually serviced at the last maintenance operation. In a preferred embodiment of the invention, the memory also stores as a permanent record data relating to all previous actually performed maintenance operations, and the mileage points at which such operations were performed. In addition, data relating to the identity of the dealer who serviced the vehicle at each maintenance point may be stored in the memory; as well as data relating to the original dealer, the make, model and year, and the serial number of the vehicle.

9 Claims, 5 Drawing Figures

PROGRAMMABLE READ-ONLY MEMORY SYSTEM FOR INDICATING SERVICE MAINTENANCE POINTS FOR MOTOR VEHICLES

BACKGROUND

Most automobile owners are lax in maintaining the maintenance schedules recommended by the automobile manufacturers. One reason for this is that there does not appear to be any device on the market which serves readily and conveniently to inform the driver of the next maintenance mileage point, and of the various items which are due for servicing at the next maintenance point. An important objective of the present invention is to provide such a device. It is intended that the preferred embodiment of the invention be provided with a pushbutton switch which, when actuated, will cause the mileage at which the next maintenance is due to be displayed, as well as the various items to be serviced at the next maintenance point.

Most car owners are also lax in maintaining records throughout the life of the vehicle as to the actual maintenance performed on the vehicle. However, such records are most important in determining the value of the car for re-sale. The unit of the present invention may also provide a permanent record of all maintenance performed on the vehicle throughout its lifetime.

As mentioned above, the unit of the invention is also capable of storing other useful data relating to the vehicle, such as the identity of the original dealer and subsequent servicing establishments, as well as other data relating to the vehicle. A selector switch may be provided to enable the user to refer not only to the mileage at which the next maintenance operations are to be performed, but also the mileage at which the last maintenance operations were performed and the items serviced at that time. The unit of the invention, insofar as the embodiment to be described is concerned, is relatively inexpensive, and it is compact and light, and is extremely easy to program and to operate.

The binary data relating to any item to be serviced at a particular mileage includes a control bit which designates by its logical state whether or not the particular item was actually serviced. Any item not serviced at a particular mileage maintenance point may be carried over to the next mileage maintenance point as an additional item requiring service at the next maintenance point.

The unit of the invention is intended to use the normal vehicle power source, although it may incorporate its own power source, if so desired.

DETAILED DESCRIPTION OF THE ILLUSTRATED EMBODIMENT

Figure 1:
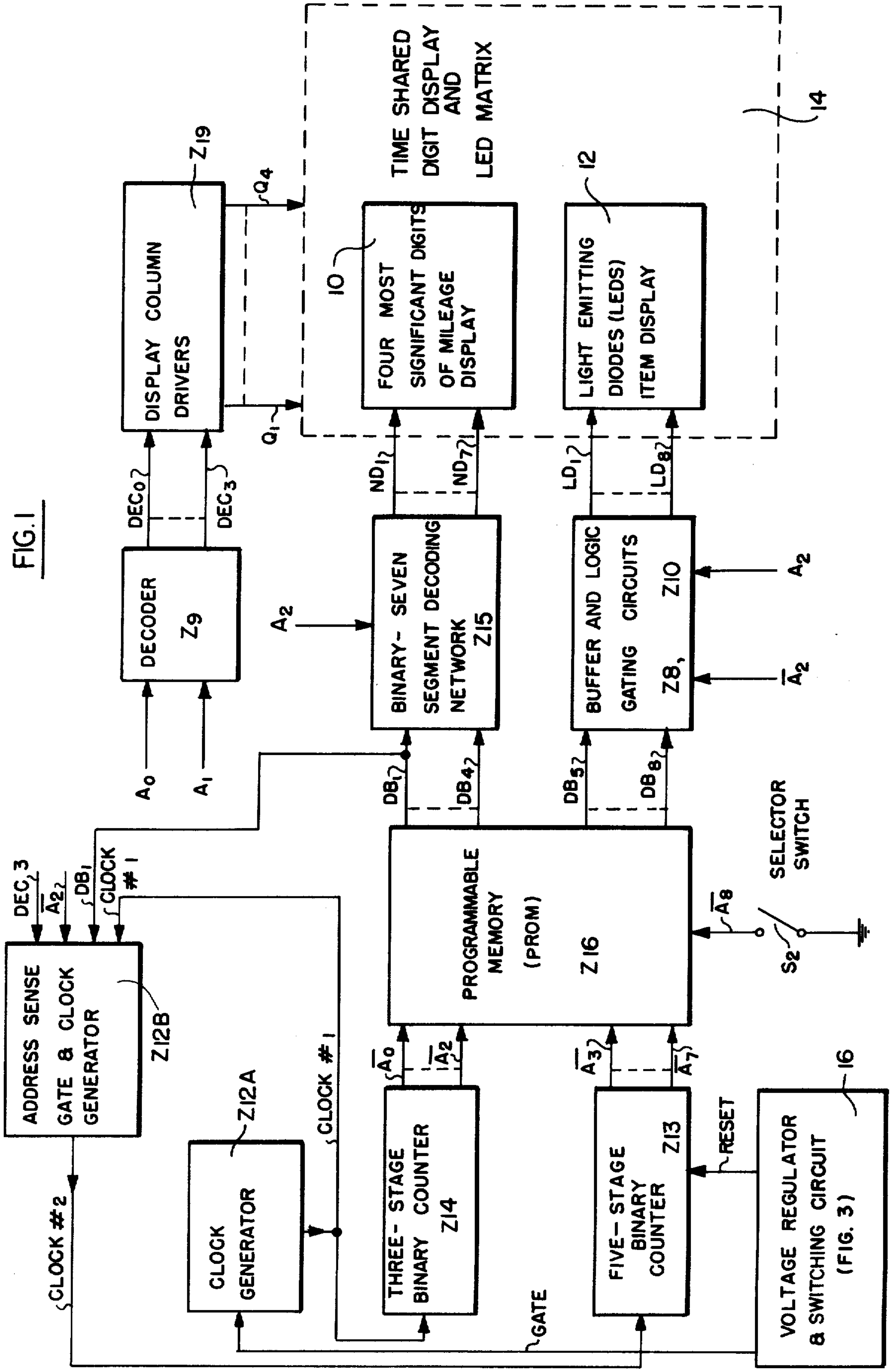
FIG. 1 is a functional block diagram of the system of the present invention, in one of its embodiments.

The system of the invention, as shown in FIG. 1, includes a programmable memory (PROM) Z16 which may, for example, be capable of storing 512 eight-bit data words (DB1–DB8). The memory Z16 is addressed by eight-bit address words $A_0$–$A_7$ derived from two binary counters Z14 and Z13. Binary counter Z14 is a three-stage counter, and is clocked by a clock generator Z12A (clock #1). The counter Z13 is a five-stage binary counter, and it is clocked by a clock generator Z12B (clock #2). Clock generator Z12B is activated by a sense gate to which the clock #1 derived from clock generator Z12A, the least significant bit (DB1) derived from PROM Z16, the second address bit ($\overline{A2}$) derived from counter Z14 and a decode bit (DEC3), are all introduced. The clock generator Z12B generates the clock #2 at any time all the terms introduced to the address sense gate are in a logical one state. The bits DB1–DB4 from each data word derived from PROM Z16 are applied to a binary-seven segment decoding network Z15, which network responds to the data bits input to produce seven segment signals ND1–ND7 which are introduced to a display 10 to activate the display, and to cause the display to exhibit the four most significant digits of the mileage, for example, at which the next servicing is to occur. The two least significant digits of the mileage are displayed as zeros since the next mileage point need not be precisely exhibited, and so as to simplify the circuit.

The binary bits DB5–DB8 of each word derived from PROM Z16 are applied to buffer and logic gating circuits Z8 and Z10 which produce eight outputs LD1–LD8. These outputs are introduced to light emitting diodes (LEDS) which constitutes an item display 12. As will be described, the mileage display 10 and item display 12 are incorporated in a time-shared matrix 14, which also will be described.

Matrix 14 is driven by a multiplicity of column drivers contained in an integrated circuit designated Z19, which is driven by a decoder Z9. Decoder Z9 responds to the least significant bits $A_0$ and $A_1$ derived from the three-stage binary counter Z14 to produce four outputs DEC0–DEC3 which drive the column drivers in integrated circuit Z19, and which cause the drivers to produce successive outputs Q1–Q4 which control the matrix 14 in a manner to be described.

A voltage regulator and switching circuit 16 is also included in the system, the details of which will be described in conjunction with FIG. 3.

Figure 2A:
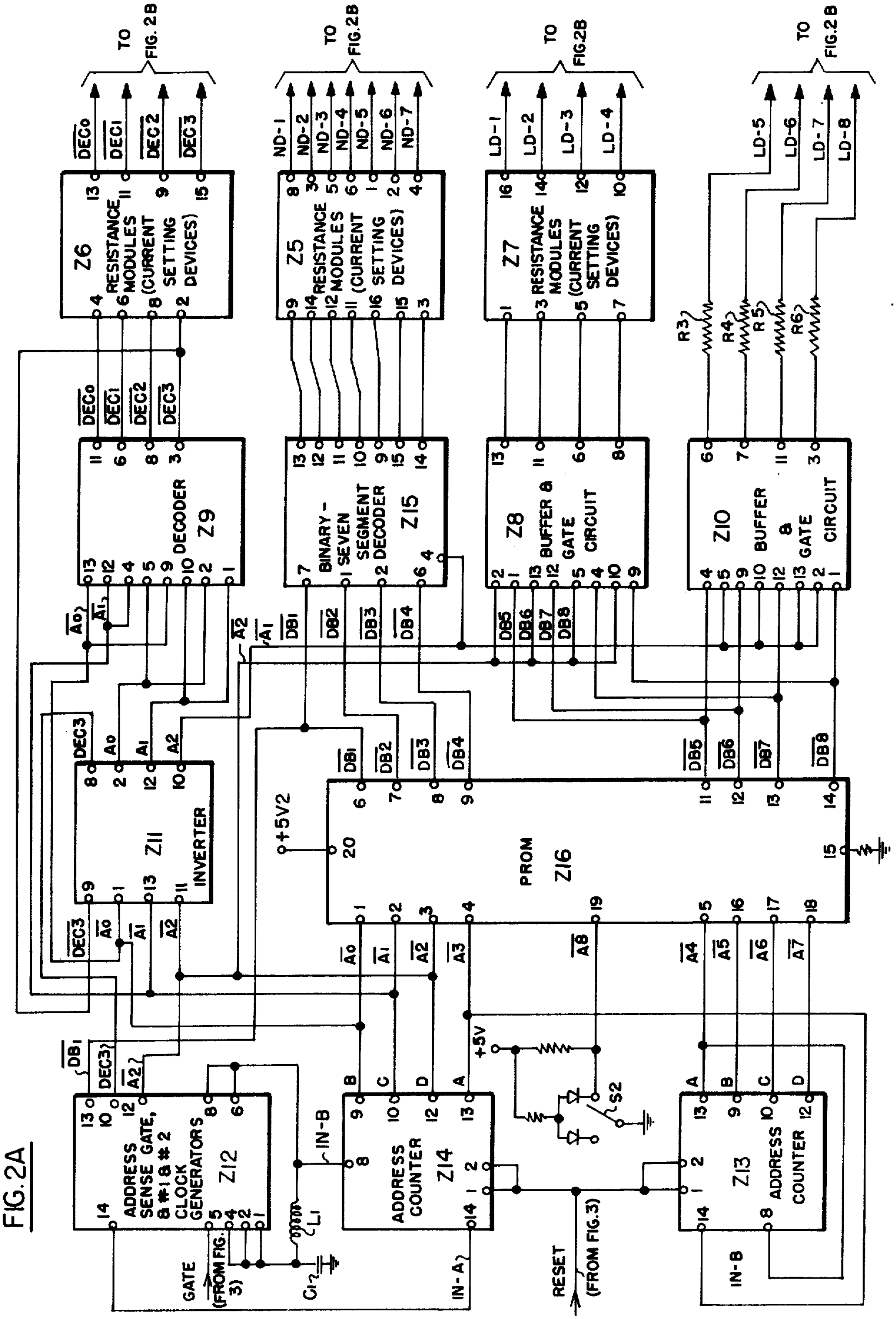
FIGS. 2A and 2B are more detailed logic block diagrams of the overall system.

As shown in FIG. 2A, the clock generators Z12A and Z12B are both contained in an integrated circuit chip Z12 which may be of the type designated LS40. The counters Z13 and Z14 may each be contained in a separate integrated circuit LS93, with two stages of the five-stage counter being contained in the integrated circuit Z14. Pins 6 and 8 of integrated circuit Z12 are connected to pin 8 of integrated circuit Z14 and to an inductance coil L1. Inductance coil L1 is connected to a grounded capacitor C1, and to pins 1, 2 and 4 of integrated circuit Z12. A gate signal derived from the voltage regulator and switching circuit 16 is introduced to pin 5 of integrated circuit Z12. Pin 14 of integrated circuit Z12 is connected to pin 14 of integrated circuit Z14. A reset signal from the voltage regulator and switching circuit 16 is introduced to pins 1 and 2 of both integrated circuits Z13 and Z14.

As illustrated, the integrated circuits Z13 and Z14 are connected to the programmable memory Z16 which may be of the type designated 74S472. Pins 6, 7, 8 and 9 of programmable memory Z16 are connected to the binary-seven segment decoder Z15 which may be of the type designated LS417. Pins 11, 12, 13 and 14 of the programmable memory Z16 are connected to integrated circuits Z8 and Z10, each of which may be of the type designated 74LS37, and which constitute buffer and gate circuits.

Figure 2B:
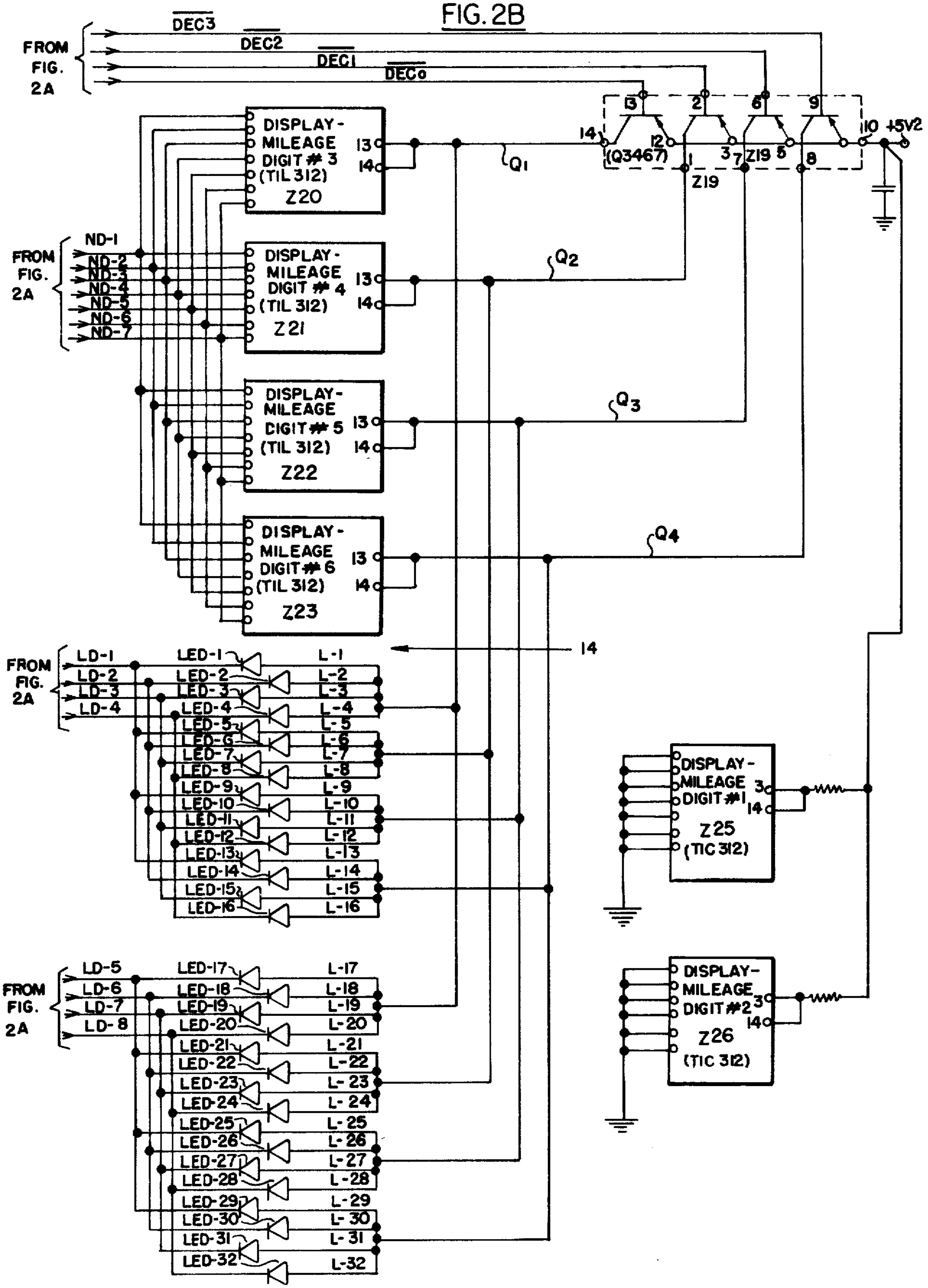

The integrated circuits Z15 and Z8 are respectively connected to integrated circuits Z5 and Z7 which constitute resistance modules which function as current setting devices. The integrated circuit Z10 is connected to resistors R3, R4, R5 and R6. The pins B, C and D of integrated circuit Z14 are connected to an inverter Z11 which may be of the type designated LS04. Pins 2 and 12 of inverter Z11 are connected to decoder Z9 which may be of the type designated 74L537, and pins 1 and 13 of the inverter are also connected to the decoder. Decoder Z9 is connected to an integrated circuit Z6 which constitutes resistance modules which function as current setting devices. The integrated circuits Z5, Z6 and Z7, and the resistors R3–R6, are all connected to the time-shared digit display and light emitting diode matrix 14 which is shown in FIG. 2B.

Specifically, the integrated circuit Z6 is connected to a group of transistors which are contained in an integrated circuit Z19, and which may be of the type designated Q3467. Pin 10 of integrated circuit Z19 is connected to a positive potential source +5V2 in the voltage regulator and switching circuit 16 which is shown in circuit detail in FIG. 3.

The integrated circuit Z5 is connected to four seven-segment displays designated Z20, Z21, Z22 and Z23, each of which may be of the type designated TIL312, and which individually represent different digits for mileage-display purposes. The collectors of the respective transistors in the integrated circuit Z19 are connected to pins 13 and 14 of the various integrated circuits Z20–Z23, as shown. When a particular one of the displays Z20–Z23 is activated by a transistor in integrated circuit Z19, the display will exhibit a decimal digit as determined by the binary states of the inputs ND1–ND7 introduced thereto. Two additional displays Z25 and Z26 are provided for the two least significant mileage digits, and they are connected so as to display zeros at all times, since, as mentioned above, the system of the invention is concerned only with the four most significant decimal digits of the mileage display.

The integrated circuit Z7 of FIG. 2A is connected to a group of light emitting diodes designated LED-1–LED16; and the resistors R3–R6 of FIG. 2A are connected to a group of light emitting diodes designated LED17–LED32. The light emitting diodes LED-1–LED4 are all connected to pin 14 of integrated circuit Z19, together with display Z20; the light emitting diodes LED5–LED6 are all connected to pin 1 of integrated circuit Z19, together with display Z21; the light emitting diodes LED9–LED12 are all connected to pin 7 of integrated circuit Z19, together with display Z22; and the light emitting diodes LED13–LED16 are all connected to pin 8 of integrated circuit Z19, together with display Z23. The light emitting diodes LED1-7–LED20 are also connected to pin 14 of integrated circuit Z19; the light emitting diodes LED21–LED24 are also connected to pin 1; the light emitting diodes LED25–LED28 are also connected to pin 7; and the light emitting diodes LED29–LED32 are also connected to pin 8 of integrated circuit Z19.

The transistors in integrated circuit Z19 constitute the display column drivers, and provide the desired time sharing function for the digit displays and light emitting diodes. For example, under the control of the decoder Z9 in FIG. 2A, the terms Q1, Q2, Q3 and Q4 successively become true. When Q1 is true, the display Z20, and light emitting diodes LED1–LED5, and light emitting diodes LED17 and LED20 are all activated, so that display Z20 displays the most significant mileage digit, and selected ones of the activated light emitting diodes become illuminated. Then, Q2 becomes true so that display Z21 and second groups of light emitting diodes are activated, and so on. The persistence of vision causes the eye to see all the displays continuously, even though the various elements are activated on a time-shared basis.

The integrated circuits Z11 (SN74LS04); Z8, 29, Z10 (SN 74LS37); 212 (SN 74LS40); 213, 214 (SN 74LS93); and Z15 (SN 74LS47) are described in a publication of Texas Instruments, Inc., of Dallas, Tex., entitled "The TTL Data Book for Design Engineers", 2nd Edition. The integrated circuit Z16 (SN 74S472) is described in a publication "The Semiconductor Memory Data Book for Design Engineers", 1st Edition of Texas Instruments. The displays Z20, Z21, Z22, Z23, Z25 and Z26 (TIL312); and the light emitting diodes LED1–LED32 (TIL 211 or 221), are described in a Texas Instruments publication entitled "The Optoelectronics Data Book for Design Eingineers" 2nd Edition. The integrated circuit Z19 (FPW3467) is described in a publication of Fairchild Semiconductor Co., of Mountain View, Calif., entitled "Discrete Products Data Book"-July 1973.

Figure 3:
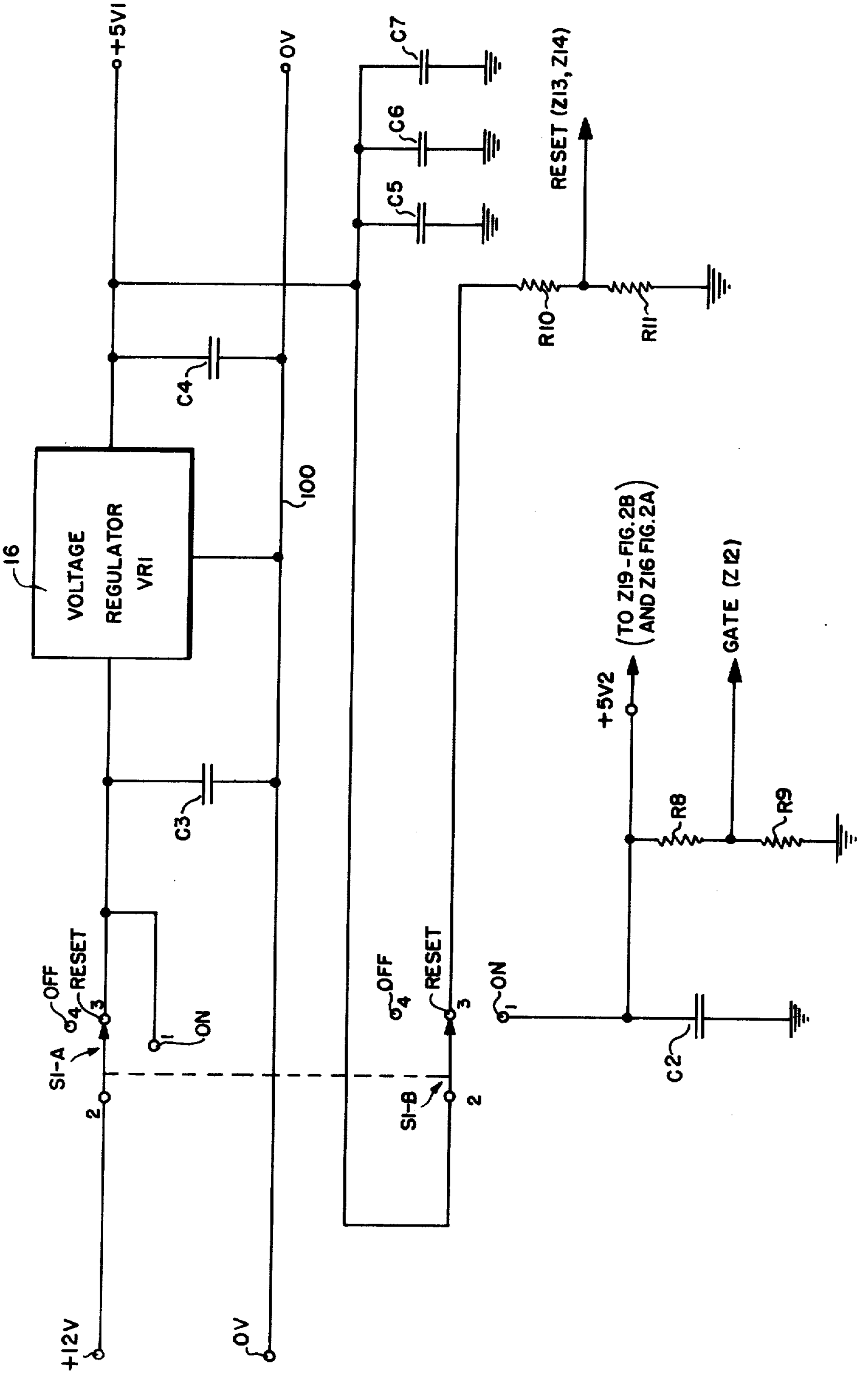
FIG. 3 is a circuit diagram of a regulated power source and switching circuit for the system of the invention.

The circuit of FIG. 3 includes a voltage regulator VR1 which may be of the type designated UA309. The voltage regulator VR1 may be of the type described in the Fairchild Semiconductor "Linear Handbook 1976" and identified therein as "UA209". The voltage regulator has an input terminal connected to a capacitor C3 and an output terminal connected to a capacitor C4. The voltage regulator also has a common terminal connected to a 0-voltage lead 100, and both capacitors are also connected to the 0-voltage lead. A pair of input terminals are connected across an unregulated 12-volt direct voltage source, and a regulated voltage designated +5V1 is produced across the output terminal. This regulated voltage is used to activate all the integrated circuits except Z16 of FIG. 2A and Z19 of FIG. 2B.

A switch S1-A is interposed in the input circuit to voltage regulator VR1, the switch being a three position pushbutton switch. Switch S1-A is mechanically coupled to a second switch S1-B which, likewise, is a three position pushbutton switch. The output of voltage regulator VR1 is connected to three grounded capacitors C5, C6, C7, and to common pin 2 of switch S1-B. Pin 3 of switch S1-B is connected to resistor R10 which, in turn, is connected to a grounded resistor R11. The common junction of the resistors is connected to the integrated circuits Z13 and Z14. Pin 1 of switch S1-B is connected to a grounded capacitor C2, and to a resistor R8. Resistor R8 is connected to a grounded resistor R9. The common junction of resistors R8 and R9 provides a gate voltage to integrated circuit Z12 in FIG. 2A. The pin 1 of switch S1-B is also connected to an output terminal which supplies a regulated positive voltage +5V2 to integrated circuits Z19 and Z16.

Switches S1-A and S1-B, therefore, constitute a three position double-pole pushbutton switch which, in the central position, enables power through the switch section S1-A to be supplied to the voltage regulator VR1.

This position of the switch is referred to as the reset position, since it holds the binary counters Z13 and Z14 at reset, by virtue of the voltage produced across resistor R11, so that all stages of both counters are at logical zero. At the reset position, there is very little power drawn by the system since +5V2 is at zero volts. When the switch is pushed to the on position, the gate signal is produced which serves to enable the #1 clock generator Z12A in integrated circuit Z12. The regulated voltage +5V2 now goes from zero volts to five volts, thereby activating the programmable memory Z16 and the display driver circuit Z19, so that the system is activated, and becomes operational. It will be understood that the switch S1 is depressed to the "on" position on a momentary basis, and only long enough to enable the operator to view the resulting display, and determine the mileage at which the next maintenance operations are due, and also to view the light emitting diode indications as to the various services to be performed at the next maintenance point.

As the switch S1 is actuated to the reset position, the counters Z13 and Z14 are set to zero, so that the zero memory location of the programmable memory Z16 is addressed, and the contents of that memory location will be present on the output line DB1-DB8, since all the address bits $A_0$-$A_7$ will be zero. At this time, the display column drivers of the integrated circuit Z19 will be activated through decoder Z9 such that Q1 will be true enabling the display Z20 of FIG. 2B and the corresponding two groups of light emitting diodes.

As mentioned above, the binary data bits DB1-DB4 from the programmable memory Z16 are converted to seven segment logic by decoder Z15. The decoder Z15 is enabled only when A2 is true, that is for the first four counts of clock #1. On the next four counts of the clock #1, A2 will be false, and decoder Z15 will be disabled. During these latter four counts DB1-DB4 present data which is encoded to identify the dealer or service company that serviced the vehicle at the mileage then being displayed in the first four counts of an eight count sequence. This is intended to serve as a permanent record of where a specific maintenance function was serviced, at a particular mileage point. This data is not displayed in the illustrated system, but is available in decoded form through the use of auxiliary equipment and is intended to be available at any time when the automobile is serviced.

Therefore, on the first count of clock #1, the display Z20 displays the least significant displayed mileage digit in response to the states of the outputs DB1-DB4 from the programmable memory Z16; on the next count of clock #1, the next display Z21 displays the next digit; on the next count of clock #1 the display Z22 displays the next digit; and on the fourth count of clock #1 the display Z23 displays the next digit. The displays Z25 and Z26 always display zero for the two least significant mileage digits. On the next four counts of the four-stage address counter, decoder Z15 is disabled, since A2 changes state, and the data outputted from the programmable memory during that time is encoded data, as explained above.

Figure 4:
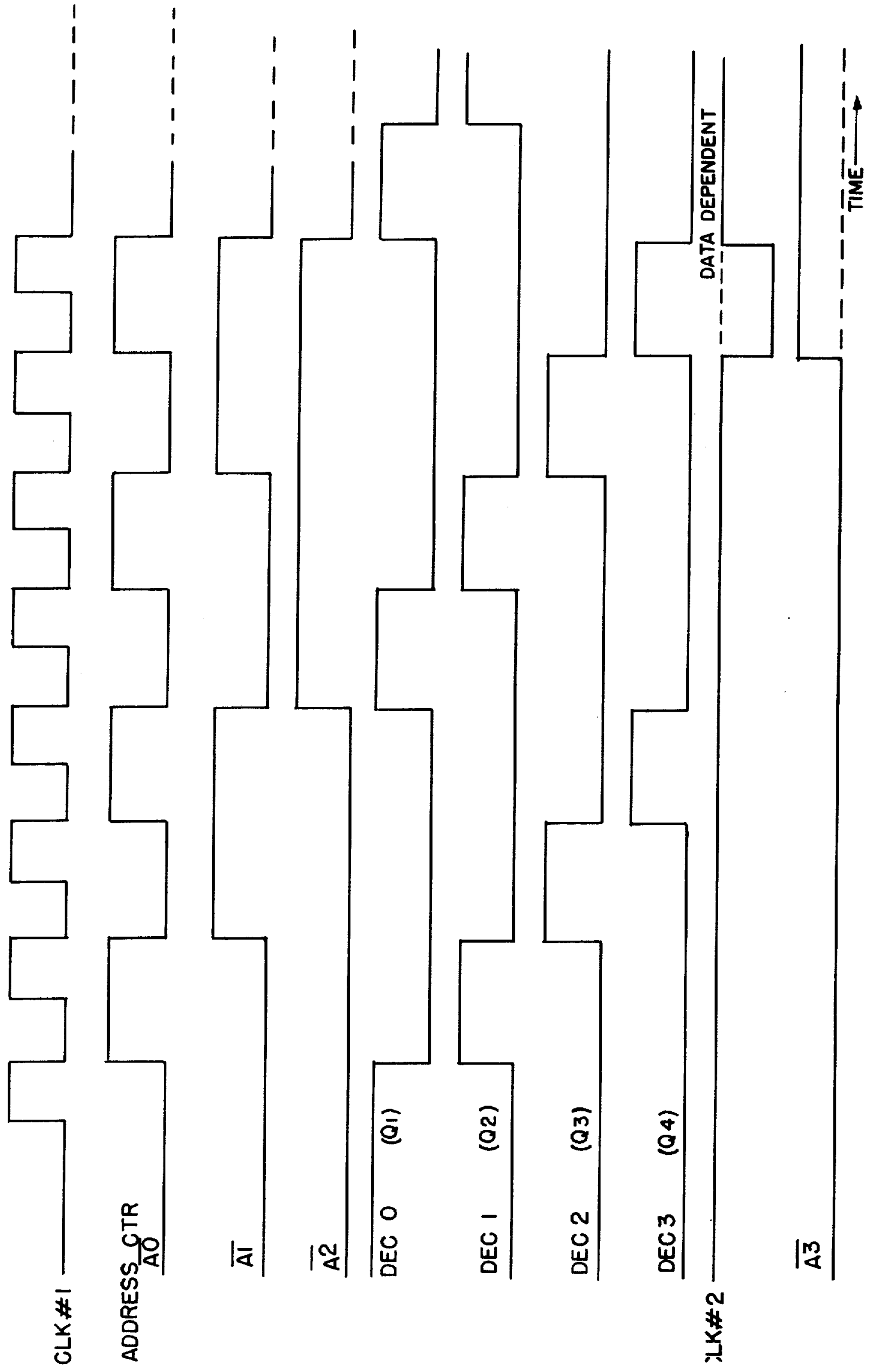
FIG. 4 is a timing diagram containing curves useful in explaining the operation of the system.

In a similar manner, data bits DB5-DB8 derived from the programmable memory Z16 are time shared so that on the first four counts of the four-stage address counter selected light emitting diodes in the different groups are energized to indicate the item to be serviced at the corresponding displayed mileage point. The integrated circuits Z8 and Z10 are connected so that the integrated circuit Z8 is enabled during the first four counts of the four-stage counter, and integrated circuit Z10 is disabled; and so that the integrated circuit Z8 is disabled and Z10 is enabled during the next four counts. The timing of the various signals will be better understood by reference to the timing diagram of FIG. 4. It will be noted from the timing diagram that the decode signals DC0-DC3 step through a four count sequence, controlling the matrix display drivers Q1-Q4 of integrated circuit Z19 in a conventional time sharing display system.

Therefore, when the system is first activated, the three-stage counter of integrated circuit Z14 counts through eight steps to cause the data stored in the first eight memory locations to be decoded and displayed, as indicated above, the display comprising the mileage for the next maintenance service, and the items to be serviced at the next maintenance service. On the eighth count of the sequence, that is, when $\overline{A2}$ is high and DEC3 is high, a decision is made through the action of a four term "nand" gate in integrated circuit Z12. If $\overline{DB1}$ is high out of memory, then the gate will be activated causing Z12 to generate the #2 clock, and thereby stepping the five-stage counter included in part of Z14 and in Z13 by one. However, if $\overline{DB1}$ is low, the gate will remain inactive, and on the next #1 clock, the three-stage counter included in integrated circuit Z14 changes back to the zero state, and the process is repeated, thereby giving the appearance of a steady state display.

The state of DB1 is programmed at the time of updating the memory each time the vehicle is serviced. In its initial state, the bit DB1 is low for all memory locations. After the first servicing, the bit DB1 in the eighth address location is changed to a high state, at which it will remain. Then, the next time the system is activated, the three-stage counter will step through the first memory location, and then, because $\overline{DB1}$ is high, Z12 will generate gate #2 causing the five-stage address counter to step and increase by one. The three-stage counter will then be stepped by clock #1, and will cause the memory to step through the next eight memory locations, which process will be repeated over and over again, because $\overline{DB1}$ at the next memory location is low.

At the next servicing, the bit DB1 at the aforesaid memory location is made high, so that the next time the system is activated, the five-stage counter will be stepped two steps, and the three-stage counter will then repeatedly cycle through the next eight memory locations, so that the data stored thereat may be displayed.

In the aforesaid manner, the display will always exhibit the mileage for the next maintenance, while retaining all previous mileage points and items.

When the selector switch S2 is in one of its two positions, the ninth address bit into memory ($\overline{A8}$) is logical zero and the first or lower half of the 512 addresses in the memory Z16 are available for display in the manner described above. As described, these 256 locations relate to the next mileage and the next service items. However, when the switch S2 is in its second position, the address bit $\overline{A8}$ is logical 1, and the upper 256 addresses are available for display. These locations may be used to store data relating to the last mileage and service items. The mileage reading in a particular location is the actual mileage where the maintenance occurred, and the items which were serviced at the last maintenance. In this manner, for each eight locations in the lower half of memory corresponding to a scheduled maintenance mileage point and certain scheduled items, there is a corresponding point in the upper half of memory which indicates the immediate last actual service mileage point and the items actually serviced. This feature resolves any question as to what actually was serviced and at what mileage the service occurred, and what actually was scheduled, and at what mileage the scheduled service was to occur.

An exception to the foregoing is in the first location utilized in memory. Since the first location represents the first time data is entered, that location can only relate to the next scheduled data. The locations in the upper memory corresponding to the immediate last service may, for example, contain coded information relating to the make, model, year, serial number and dealer identification number. Since this location in memory is otherwise unused, such data is useful when up-dating the memory for automatic data recording and automatic data selection for maintenance scheduling purposes.

The memory Z16 may be programmed by any appropriate known programming methods and techniques. In programming the memory, the data lines DB1–DB8, the address lines A0–A8, the clock #1, the reset and gate signals and the power source are made available externally for control purposes by any appropriate known means. At the time of servicing and up-date, the system is connected to an auxiliary device for either automatic, manual, or a combination program up-date. The particular memory size selected in the system described above is a theoretical optimum which allows thirty-two items of display and thirty-two different mileage points, for each of the next servicing indications in the lower part of the memory and for the last servicing indications in the upper part of the memory. In an average of 6,000 miles between maintenance, this corresponds to 192,000 miles for the memory. Of course, there is nothing but cost to limit the size of the memory, which may be made smaller or larger as a design option, depending upon the economics and the design requirements.

The invention provides, therefore, a relatively simple solid state system which is pushbutton operated, and which permits the user, merely by actuating a pushbutton switch, to determine the mileage at which the next servicing should take place, and the items to be serviced at the next mileage point. Also, by actuating a selector switch, the user can determine the mileage at which the last servicing occurred, and the actual items which were serviced at the last maintenance point. The system of the invention provides a permanent record of the maintenance operations which occurred throughout the life of the vehicle. Also, as mentioned above, the system is capable of storing other vital information such as the identity of the original dealer, the identity of the dealers performing the maintenance operations, and other essential data.

It will be appreciated that although a particular embodiment of the invention has been shown and described, modifications may be made. It is intended in the claims to cover the modifications which come within the spirit and scope of the invention.

What is claimed is:

1. A system for aiding in the maintenance of a motor vehicle comprising: a programmable read-only memory permanently storing data at predetermined memory locations representing mileage points at which maintenance operations are to be carried out and data representing various items to be serviced at the individual mileage points; means coupled to the memory for addressing the predetermined different memory locations therein to derive first data signals therefrom representing mileage points at which certain maintenance operations are to be performed, and to derive second data signals therefrom representing the maintenance operations to be performed at such mileage points; first display means coupled to the memory and responsive to the first data signals for exhibiting the mileage corresponding to said mileage points; and second display means coupled to the memory and responsive to said second data signals for exhibiting indications representing the maintenance operations to be carried out at said mileage points.

2. The system defined in claim 1, in which said programmable read-only memory also contains at other memory locations therein data representing mileage points at which previous maintenance operations occurred, and which includes a selector switch circuit connected to said memory for selectively causing said addressing means to address said first-named memory locations and said other memory locations thereby causing said first data signals to represent the mileage point at which the next maintenance operations are to occur for one position of said switch, and for causing said first data signals to represent the mileage point at which the last maintenance operations actually occurred for a second position of said switch.

3. The system defined in claim 1, and which includes time-sharing circuit means connecting said first and second display means to said memory.

4. The system defined in claim 1, in which said addressing means comprises counter means enabling successive memory locations to be addressed.

5. The system defined in claim 4, in which said counter means includes a first counter for causing a predetermined number of the memory locations to be successively and cyclically addressed, and a second counter for causing a plurality of such predetermined number of memory locations to be successively addressed; and gate means connected to the second counter to cause the second counter to step from one of the predetermined number of memory locations to the next only when a data bit in one of the memory locations has a particular logical state.

6. The system defined in claim 1, in which said first display means includes a plurality of seven-segment display devices for displaying a corresponding plurality of mileage digits.

7. The system defined in claim 1, in which said second display means includes a plurality of light emitting diodes for displaying indications representing the particular servicing items.

8. The system defined in claim 1, in which data representing the identity of the person who serviced the vehicle at each of the mileage points is stored in said memory.

9. The system defined in claim 1, in which the memory includes data representing the identity of the vehicle at a predetermined memory location therein.

* * * * *